Figure 1:
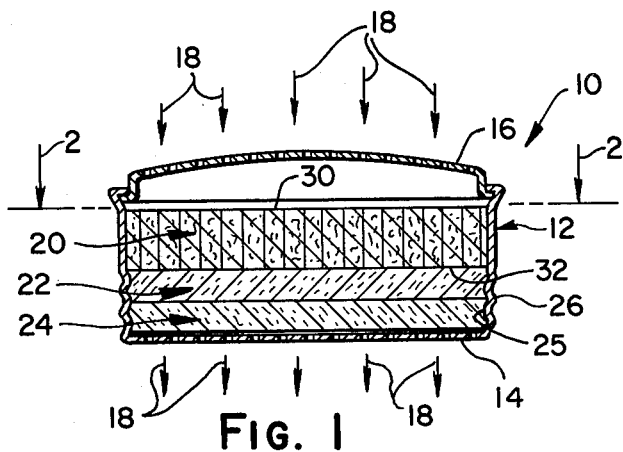
Figure 2:
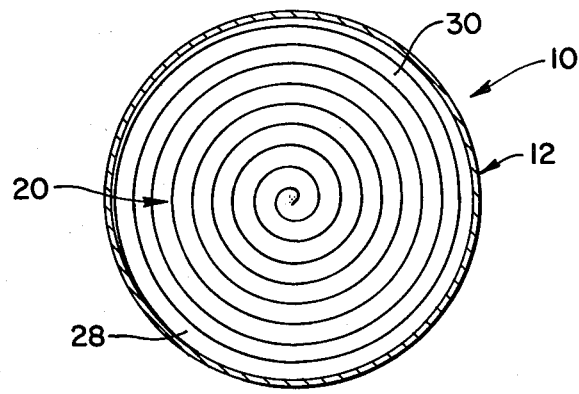
Figure 3:
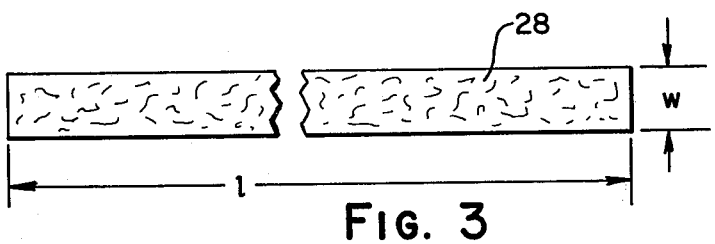
Figure 4:
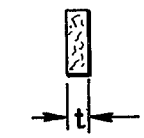

United States Patent [19]

Grovesteen et al.

[11] 4,294,599
[45] Oct. 13, 1981

[54] AEROSOL FILTER CARTRIDGE

[75] Inventors: William R. Grovesteen, Southbridge; John A. Jones, Wilbraham, both of Mass.

[73] Assignee: American Optical Corporation, Southbridge, Mass.

[21] Appl. No.: 122,206

[22] Filed: Feb. 19, 1980

[51] Int. Cl.³ .................... B01D 50/00; B01D 46/12
[52] U.S. Cl. ........................ 55/485; 55/489; 55/498; 55/520; 55/524; 55/DIG. 33; 55/DIG. 35; 128/206.17
[58] Field of Search ............... 55/485, 489, 498, 520, 55/524, DIG. 33, DIG. 35; 128/206.17

[56] References Cited

U.S. PATENT DOCUMENTS

| 1,781,254 | 11/1930 | Stelzner | 55/485 X |
|---|---|---|---|
| 2,000,064 | 5/1935 | Cover | 55/DIG. 35 X |
| 2,400,076 | 5/1946 | Dauster | 55/498 |
| 2,400,180 | 5/1946 | Venable | 55/498 |
| 2,505,173 | 4/1950 | Conley | |
| 2,640,481 | 6/1953 | Conley | |
| 2,744,524 | 5/1956 | Whipple | |
| 2,772,195 | 11/1956 | Gaarder | 55/520 X |
| 3,944,403 | 3/1976 | Simpson et al. | 55/DIG. 33 X |
| 4,141,703 | 2/1979 | Mulchi | 55/DIG. 33 X |

FOREIGN PATENT DOCUMENTS 499813  1/1939  United Kingdom ................. 55/520

Primary Examiner—Kathleen J. Prunner
Attorney, Agent, or Firm—Alan H. Spencer

[57] ABSTRACT

An aerosol respirator cartridge employing a prefilter having the form of a closely spiraled fiberglass mat functioning to distribute captured aerosol particles substantially uniformly therethrough for avoidance of prior art aerosol skin affect and the accompanying increased inhalation resistance.

6 Claims, 4 Drawing Figures

AEROSOL FILTER CARTRIDGE

BACKGROUND OF THE INVENTION

1. Field of the Invention

Respirator cartridges with particular reference to improvements in cartridges designed for protection against aerosols.

2. Discussion of the Prior Art

Heretofore, aerosol filter cartridges have been subject to a rapidly increasing resistance to airflow (inhalation) during use as a result of poor distribution of captured aerosol particles. The surfaces of conventional prefiltering components characteristically rapidly load with aerosols. That is to say, a skin of closely packed aerosol particles is quickly formed over the filtering system which produces a barrier to air flow and render useful life of the cartridges unduly short.

It is, accordingly, an object of this invention to extend the useful life of respirator cartridge filtering systems, more particularly of the aerosol filtering type, and to improve the operating efficiency thereof.

A more specific object is to accomplish the above with improvement in prefiltering components of aerosol respirator cartridges, i.e. to provide for greater distribution of captured aerosol particles in the prefiltering components and a corresponding lessening of resistance to air flow during use.

Still another object is to minimize breathing resistance in aerosol respirator cartridges throughout the usful life of such cartridges; and Yet another object is to accomplish the foregoing with minimal complication and cost of cartridge construction.

Other objects and advantages of the invention will become more readily apparent from the following description.

SUMMARY OF THE INVENTION

The above objects and corollaries are accomplished with improved prefilter design in an aerosol filtering cartridge. Greater than usual distribution of a challenge aerosol is accomplished in prefiltering by spiraling a fiberglass mat which is placed edgewise against the final filtering components of the cartridge.

The greater surface area afforded by spiraling provides for improved distribution of captured aerosol particles and less surface loading for corresponding ease of resistance to airflow (inhalation) during use.

Details of the invention will become more readily apparent from the following description when taken in conjunction with the accompanying drawings.

IN THE DRAWINGS

FIG. 1 is a vertically cross-sectioned illustration of a preferred embodiment of the present invention;

FIG. 2 is a partially cross-sectioned view of the respirator cartridge of FIG. 1 taken along line 2—2;

FIG. 3 is a plan view of a cartridge component which is depicted in a form supplied for final spiraling according to the invention; and FIG. 4 is an end view of the component of FIG. 3.

DESCRIPTION OF THE PREFERRED EMBODIMENTS

Referring to the drawings, respirator cartridge 10 (FIG. 1) comprises the usual shell 12 of stamped, drawn or otherwise formed sheet metal (e.g. aluminum) or plastic. Bottom 14 and cover 16 are perforated to permit the passage of air (inhalation) in the direction of arrows 18 through the cartridge.

After placement of the filtering system components 20, 22 and 24 in shell 12, cover 16 is conventionally edge-crimped in place (FIG. 1). External threads 26 are provided for connecting cartridge 10 to respirator face mask (not shown) with cover 16 exposed to the particular environment against which respiratory protection is sought. Perforated bottom 14 being thereby disposed interiorly of the facepiece provides the user with a source of filtered air.

Those interested in details of a respirator face mask which will serve the above purpose may refer to U.S. Pat. Nos. 2,505,173; 2,640,481; and 2,744,524.

Final filtering components 22 and 24 of the cartridge 10 system are, in conventional fashion, preferably formed of resin impregnated wool felt, e.g. each having an initial diameter of approximately 3 inches and thickness of approximately ¼ inch. A suitable material is 25%±5% wool, 55%±5% polypropylene which is 15% to 25% resin impregnated on a bone dry basis and has an areal density of 11 to 17 oz/yd$^2$.

Edges of these filter components 22 and 24 may be cemented to shell 12 or assembled as illustrated with component 24 cemented at edge 25 and component 22 press-fitted into threads 26.

Immediately above and resting against or adjacent to filter component 22 is component 20 hereinafter referred to as "prefilter 20".

As illustrated more clearly in FIGS. 2–4, prefilter 20 comprises a closely spiraled mat 28 of glass fibers which is preferably placed in edgewise engagement with final filter component 22. Prefilter 20 is pressed into place in shell 12 against component 22 and self-held in the illustrated position of use. It may be cemented to the inner side of shell 12 and/or to component 22, if desired.

A suitable mat 28 from which spiraled air-receiving and air-emitting faces 30 and 32 of prefilter 20 are formed may comprise a thickness of approximately ¼" of randomly oriented glass fibers bonded together with a thermal setting organic resing and having an areal density of from approximately 17 to to 23 ozs. per 100 sq. ft. with an airflow resistance of 2.0±1.0 mm water head at a flow rate of 107 liters per minute through a 100 sq. cm. area of filter medium. The above is commercially available from Owens-Corning Fiberglass Corporation of Wellesley, MA USA.

This prefilter 20 is preferably initially of a length l (FIG. 3) of approximately 36 inches, a width w of approximately ½ inch and a substantially constant thickness t of approximately 3/16 inch with the exception of its final outermost one half turn of spiraling being gradually thinned to approximately zero thickness at termination so as to completely fill the inner circular configuration of shell 12 (see FIG. 2).

This filtering system has proven to overcome prior art surface loading when used as prefiltering protection against aerosols.

For example, extensive testing of the above described and illustrated respirator filtering system was conducted with application of an aerosol having 20 Mg/cubic meter of lead using a flow rate through the cartridge of approximately 16 liters per minute (LPM) for 312 minutes. Initial and final inhalation resistances were measured with an applied airflow of 42.5 LPM.

Respirators constructed according to the present invention showed mean initial and final inhalation resistances of 12.7 and 39.3 mm water head respectively.

Prior art devices identically tested showed mean average initial and final inhalation resistances of 16.7 and 53.6 mm water head respectively.

All respirator cartridges tested showed lead fume penetration considerably below acceptable limits, e.g. considerably below the maximum allowable 1.5 Mg lead fume penetration for dual cartridge respirator systems as set by the National Institute for Occupational Safety and Health (NIOSH).

In the above testing, single cartridges constructed according to the present invention showed a mean average lead fume penetration of 0.06 Mg when subjected to the foregoing lead containing aerosol according to NIOSH testing standard, i.e. with an applied aerosol containing approximately 20 Mg per cubic liter of lead at a flow rate through the cartridge of approximately 16 liters per minute.

The foregoing illustrates the accomplishment of objectives of the present invention. However, it should be appreciated that various modifications and adaptations of the precise form of the invention described above may be made to suit particular requirements and it is intended that all modifications which incorporate the novel concept disclosed are to be construed as coming within the scope of the following claims or the range of equivalency to which they are entitled.

We claim:

1. In an aerosol filter cartridge having a shell containing an air filtering system including final filtering components, the improvement of a prefiltering component comprising:

an elongated mat of glass fibers, said mat being closely spiraled with opposite edges thereof providing opposite air-receiving and air-emitting faces of said component, one of said faces being adjacent to said final filtering components and a side of said spiraled mat being closely fitted against said shell.

2. The improvement according to claim 1 wherein said fibers of said mat are randomly oriented.

3. The improvement according to claim 1 wherein said mat has a greater width dimension than thickness and said side thereof fitted against said shell is of said width dimension.

4. The improvement according to claim 3 wherein said opposite edges of said mat are of said thickness dimension.

5. The improvement according to claim 1 wherein said fibers of said mat are bonded together.

6. The improvement according to claim 5 wherein said bonding of said fibers is effected with a thermal setting organic resin.

* * * * *